Jan. 4, 1955     E. J. SCHAEFER     2,698,911
SUBMERSIBLE MOTOR CONSTRUCTION
Filed Nov. 30, 1950
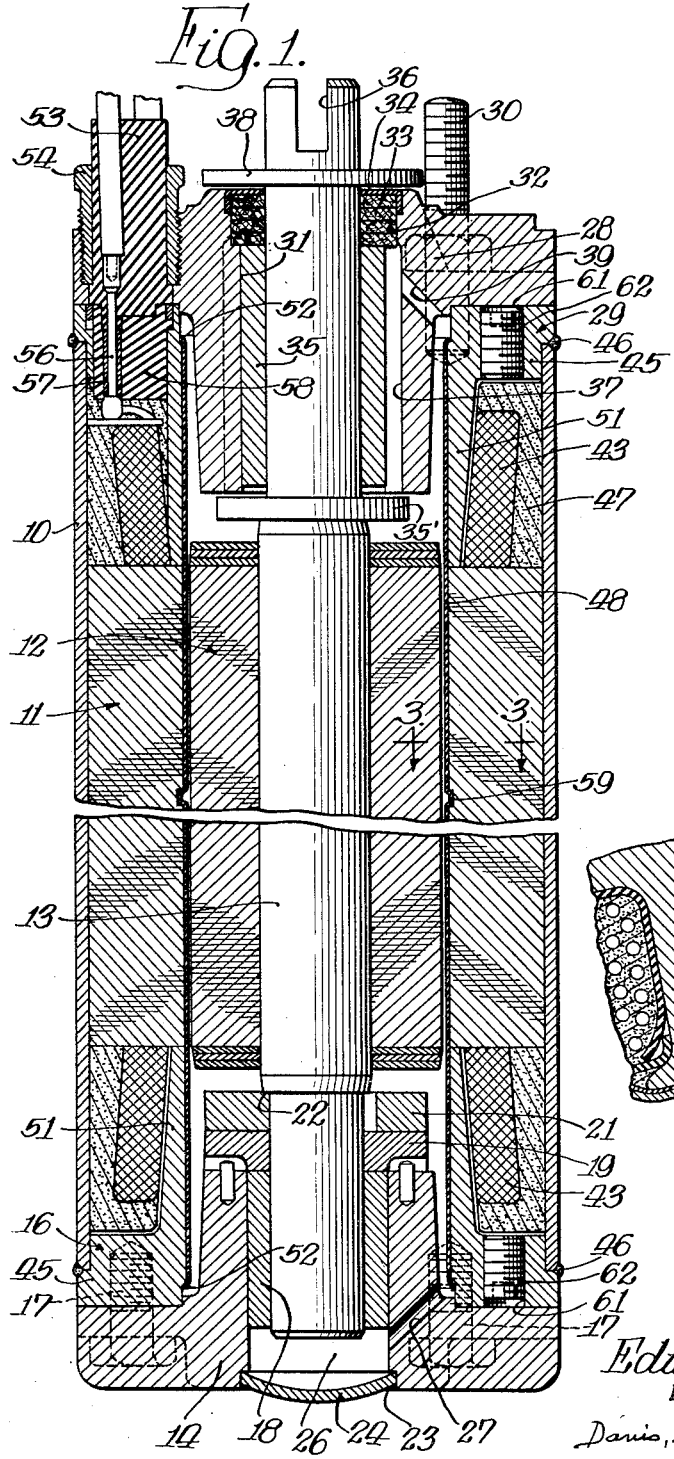
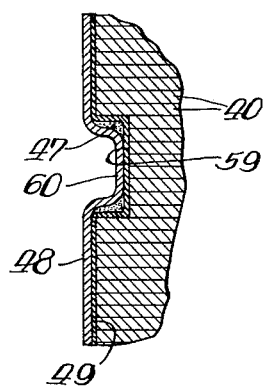
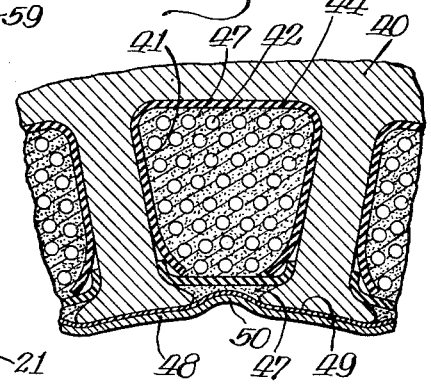
INVENTOR.
Edward J. Schaefer,
BY
Davis, Lindsey, Hibben & Noyes
Atty's.

United States Patent Office 2,698,911
Patented Jan. 4, 1955

2,698,911

SUBMERSIBLE MOTOR CONSTRUCTION

Edward J. Schaefer, Fort Wayne, Ind.

Application November 30, 1950, Serial No. 198,435

3 Claims. (Cl. 310—86)

This invention relates generally to electric motors and particularly to electric motors adapted for operation when submerged in a liquid. The present application is a continuation-in-part of my earlier copending application Serial No. 131,888, filed December 8, 1949.

Electric motors have heretofore been made which have an outer casing completely enclosing both the rotor and the stator and completely sealing them from contact with the liquid in which the motor operates. Such a motor, however, requires a highly effective seal about the motor shaft and necessitates the provision of lubrication within the casing for the shaft bearings. Lubrication difficulties may be avoided by utilizing the liquid in which the motor operates as the lubricant but in such a construction the stator and rotor must be separately sealed to prevent access of the liquid to the rotor and stator windings and still permit free flow of the liquid through the motor to the bearings thereof. With the latter construction, not only are lubrication difficulties eliminated but also the necessity of using rotating seals is avoided.

In a motor of this character, the rotor may be readily protected since it is of the squirrel cage type without insulated windings. Thus, the exterior of the rotor may be protected by such conventional methods as plating the exterior surface, or painting it, or subjecting the surface to the corrosion prevention treatment known commercially as "bonderizing" which involves the formation of an iron phosphate coating by chemical action.

The stator, which is of annular construction extending about the rotor, may be externally closed by a rigid metal casing or shell extending endwise beyond both ends of the stator and having end closures rigidly secured thereto. The interior of the stator, however, presents a problem in attempting to find a suitable seal. A suitable seal must, of course, perform its chief function of excluding liquid from the windings of the stator but it also must be such that it does not cause excessive electrical losses in the motor. Motors have heretofore been made in which a metallic cylinder is inserted into the stator and connected to the end closures to seal the stator windings. Such cylinders have had sufficient thickness to be self-supporting, but with metal of such gauge the electrical losses are so great as to render this construction impractical for most purposes. Moreover, in many cases of submersible motors there is a maximum permissible diameter for the motor and to obtain higher horsepower it is necessary to increase the length of the motor. Obviously, as the length of the stator increases, the problem of utilizing a thin liner becomes more difficult.

The general object of the invention is, therefore, to provide a novel stator construction adapted to operate in a liquid and having its interior sealed in such a way that electrical losses due to the seal are held to a minimum.

Another object is to provide a novel stator construction which is effectively sealed for operation in a liquid and in which the seal may be provided in a simple manner at a moderate manufacturing cost.

A further object is to provide a novel stator construction of the foregoing character, in which the expansion of the parts, due to heat generated during operation of the motor, is provided for.

An additional object of the invention is to provide a novel method for assembling a sealed stator construction of the foregoing character.

Other objects and advantages will become apparent from the following description taken in connection with the accompanying drawings, in which:

Figure 1 is a longitudinal sectional view of a motor embodying the features of the invention;

Figure 2 is a fragmentary sectional view, on an enlarged scale, of a portion of the structure shown in Figure 1; and Figure 3 is a fragmentary sectional view, on an enlarged scale, taken substantially on the line 3—3 of Figure 1.

As heretofore mentioned, the present invention relates to submersible electric motors, and in particular contemplates a motor of such character that the liquid, such as water, in which the motor is submerged, is free to pass through the motor between the stator and the rotor thereof. Motors of this type are frequently used in the bottom of a well and are connected to a pump to drive the latter. More specifically, the motor is usually suspended, and receives its support, from the pump casing and has its drive shaft connected to the shaft of the pump for operating the latter. Because of space restrictions, such a motor is usually made of small diameter but of quite elongated form.

As shown in Fig. 1 of the drawing, a motor of the type herein contemplated may comprise an outer shell or casing in the form of a cylindrical metal sleeve 10, preferably of stainless steel, within which is mounted a stator 11 of annular form and a rotor 12 positioned within the stator. In the present instance, the stator and rotor are shown as being positioned intermediate the ends of the shell 10, and the rotor is carried on a shaft 13 supported in bearings located at the ends of the shell. Thus, the bearing structure for the lower end of the rotor 12 comprises a bottom cap 14 rigidly secured to an end closure 16 for the shell 10 by means of a plurality of bolts 17 extending through the cap and threaded into the end closure. For radial support of the shaft 13, a cylindrical bearing member 18 is mounted in the cap 14 to embrace the lower end of the shaft 13. The bottom end of the motor also includes a bearing member 19 to take the thrust of the rotor, such bearing member coacting with a thrust plate 21 rigidly secure on the motor shaft in engagement with a shoulder 22 thereon. The radial bearing member 18 as well as the thrust bearing member 19 are made of a material suitable for use with the liquid in which the motor operates. In the case of water, these two bearing members are preferably made of graphite. However, it will be understood that they may be made of any other suitable material, depending upon the character of the liquid.

As mentioned above, the motor comprising the present invention is of the type in which the motor is submerged in a liquid and provision is made for admitting liquid to the interior of the motor structure. In the embodiment of the invention illustrated in the drawing, liquid is admitted to the interior of the motor at the upper end thereof and the lower end of the motor structure is substantially closed with the result that continuous passage of liquid through the motor structure is avoided. Thus, the bottom cap 14 has a central aperture 23 which is substantially sealed by means of a disk 24 inserted in the aperture 23. The lower end of the shaft 13 terminates slightly below the lower end of the bearing member 18 and a liquid chamber 26 is thus defined between the lower end of the shaft 13 and the closure or disk 24. The liquid is permitted to enter the chamber 26 in the bottom bearing cap 14 by means of a plurality of passages or bores 27 extending upwardly and outwardly from the chamber 26. The liquid thus supplied to the chamber 26, as hereinafter described in detail, provides for lubrication of the lower end of the shaft 13 and its bearing members 18 and 19.

The upper end of the motor has a generally similar construction, although, of course, it requires no thrust bearing. Thus, an upper cap 28 may be provided which is similarly connected to an upper end closure 29 by means of a plurality of bolts 30. The cap 28 is provided with a central bore 31 having a counterbore 32 at the upper end thereof, and a plurality of felt pads 33 and a cap or retainer 34 are disposed in the counterbore 32 in loosely fitting relation with the upper end of the shaft 13. Within the bore 31 is positioned a radial bearing member 35, preferably of graphite, which holds the upper end of the rotor shaft 13 properly positioned in the upper cap. In order to protect the bearing 35, a collar 35[1] is rigidly carried on the shaft 13 for abutting the lower end of the cap 28 and thereby preventing the rotor 12 from hitting the bearing 35 in the event that the rotor shifts during shipping or handling of the assembled motor. The extreme upper end of the shaft 13 is provided with means for connecting it to the shaft of the pump, and in this instance is shown as having a transverse groove 36, into which a tongue on the pump shaft or on a separate coupling member may be inserted.

During operation of the motor, the liquid in which the motor is submerged, which is usually under substantial pressure, passes freely through the clearance between the retainer 34 and the shaft 13 and thence through the felt pads 33 into a plurality of longitudinal grooves 37 extending from the counterbore 32 at a point above the bearing member 35 downwardly through the lower end of the cap 28. The felt pads 33 serve to filter out sand or other solids from the entering liquid. To provide additional protection from sand and other foreign material, a sand slinger 38 in the form of a disk is mounted at the upper end of the shaft 13 above the retainer 34. The liquid thus entering the motor structure also provides lubrication for the upper bearing member 35. As the liquid passes downwardly through the grooves 37, it flows through the air gap between the rotor 12 and the stator 11 and thence through the angular passageways 27 into the chamber 26 as hereinbefore described. During entry of the liquid into the motor structure, air is displaced upwardly and escapes from the upper end of the motor through the felt pads 33 and the counterbore 32. A plurality of angular bores 39 are provided in the upper cap 28 to prevent air from being trapped in the annular space between the cylindrical inner end of the cap 28 and the adjacent portions of the stator structure.

Although it is possible to operate the motor with the bottom closure 24 removed whereby to permit liquid to enter at the bottom of the motor and flow continuously through the motor structure, I prefer to utilize the bottom closure 24 so that in fact the motor receives substantially only one filling of liquid. In this way not only do I obtain adequate bearing lubrication, but in addition I am able to avoid the difficulties which may arise as the result of the deposition of solid material at the interior of the motor structure. In other words, if the water in which the pump operates has a rather high content of dissolved salts or solids, continuous passage of fresh water through the motor structure in such case would result in an increasing accumulation of solid deposits which eventually would obstruct the air gap between the rotor and stator and thereby interfere with the normal operation of the motor. However, by permitting substantially only one filling of water to enter the motor, I am able to avoid this undesirable condition.

In motors of this type where liquid is admitted to the interior thereof, the rotor 12 as well as the stator 11 are separately sealed since the liquid would obviously have a harmful effect if permitted to enter the windings and laminations of the rotor or stator. The rotor, which may be of the squirrel cage type without insulated windings, can be easily protected against corrosion by methods which are more or less conventional. Thus, as heretofore stated, the exterior of the rotor may be protected by plating or painting the exterior surfaces thereof or subjecting such surfaces to a corrosion preventing treatment, such as forming an iron phosphate coating thereon by chemical action, which process has numerous commercial names, one of which is "bonderizing."

The stator, however, cannot be sealed on its interior by such a simple method as is employed in connection with the rotor because of the voltage characteristics of the windings in the stator. The stator comprises a core structure formed by a stack of annular laminations, which are indicated at 40 in Figs. 2 and 3, and the laminations are punched with a plurality of inwardly opening slots 41 to receive windings 42. Such windings usually project beyond the ends of the stack of laminations, as indicated at 43 in Fig. 1. A layer of insulating material 44 is disposed around the interior of the spaces formed by the superimposed slots 41 in order to insure insulation of the windings 42 from the laminations 40. The stack of laminations is held in position within the shell 10 by means of the end closures 16 and 29 each of which is formed with an annular flange portion 45 which receives the screws 17 and 30, and an axially extending cylindrical portion 51. The flange portions 45 are welded to the shell, as at 46, and the inner ends of the cylindrical portions 51 abut the ends of the stack. As hereinafter described in detail, a filler material 47 may be employed to fill the interstices between the windings 42 within the slots 41 and also the spaces around the projecting end portion 43 of the windings.

It will be seen that the exterior of the stator is sealed by the shell 10. However, sealing of the interior of the stator is equally important to prevent the liquid from gaining access between the laminations and into the windings 42 in the slots 41. Such seal, moreover, must be of such a nature as not to interfere with the electrical characteristics of the motor. More specifically, the seal should not materially increase the air gap between the stator and the rotor, nor should the material of which the seal is made be such as to create high electrical losses by having induced in it large parasitic electric currents. At the same time, the interior seal must be fully capable of excluding the liquid from the stator itself and cannot be permitted to bulge due to heat generated in the motor or to pressure of the oil or plastic material which may be utilized to fill the interstices in the windings.

In the case of the metal cylinder or sleeve inserted within the stator in the air gap between the stator and rotor as heretofore employed, it has been deemed necessary to make such a sleeve of sufficient thickness to be self-supporting and to be carried from the ends of the motor structure. But a cylinder of such thickness causes electrical losses in the motor which are so great that, for many purposes, such construction is highly impractical.

The present invention contemplates the use of a stainless steel cylinder which is so thin that the electrical losses are minimized and the motor becomes practical in size and permits performance which would not be obtainable if the sleeve were of the thickness heretofore deemed necessary. However, with a sleeve of the present character, there is insufficient strength in the sleeve to render it self-supporting. The invention, therefore, contemplates having such a sleeve receive its mechanical support from the stator itself throughout substantially the entire length thereof. It has been found that if such a stainless steel sleeve is not substantially thicker than .005 of an inch, the electrical losses involved are relatively minor and the sleeve itself, if rigidly secured to the stator throughout its length, will retain its proper shape despite the changes of temperature and pressure to which it may be subjected and will effectively seal the stator against access of liquid thereto. With a sleeve of this character, it is contemplated that there may be an air gap between it and the rotor of about .012 of an inch.

In the drawing, such a sleeve is indicated at 48. To secure the sleeve to the stator, and particularly to the stack of laminations 40, the sleeve is bonded to the stator by means of a layer or coating of a metal-to-metal bonding agent or adhesive material, such as rubber base or resinous adhesive commonly utilized for metal-to-metal bonding. As hereinafter explained in detail, the sleeve and the stator bore are preferably coated with the adhesive and the sleeve is then inserted into the stator and may be expanded by means such as a rubber expander into rigid adhesive engagement with the stack of laminations. Thus, in Figs. 2 and 3, I have illustrated such a coating at 49. Since the entire area of contact between the liner 48 and the stack of laminations 40 includes such adhesive coating 49, the liner is rigidly supported throughout its entire area of contact, thus giving it adequate support in spite of its extreme thinness.

In order to render the liner more rigid and to enhance the attachment of the liner to the stator, the liner 48 is expanded or bulged outwardly into the slots 41 of the laminations 40, as shown at 50 in Fig. 3. Expanding the liner in this manner forms ridges or longitudinally extending ribs which effectively interlock with the openings into the slots 41. In addition, it will be seen that the ridges or ribs 50 impart stiffness to the liner and thus reinforce it. Moreover, as hereinafter described, the filler material 47 adheres to the bulged portions 50 to provide additional support for the liner.

The ends of the stator 11 are sealed by the end closures 16 and 29 which have their flange portions 45 secured to the shell 10 by the welding 46. The cylindrical portions 51 of the end closures are aligned with, and are of approximately the same diameter as, the interior of the stator laminations and fit over the outwardly projecting portions 43 of the stator windings. The liner 48 extends at each end beyond the core structure of the stator and onto the portions 51 of the end closures 16 and 29. The liner is thus bonded to the end closures by the adhesive 49, and the ends of the liner are preferably secured to the end closures by soldering or the like at 52 whereby the liner is supported throughout its length. Wiring connections for the stator windings may be brought in through a rubber sealing plug 53 mounted in a bushing 54 which is threaded into an aperture in the upper cap 28. The conductors are provided with prongs, indicated at 56, which are detachably fitted into complementary clip members 57 connected to the stator windings. The clips 57 are mounted in a sealing means comprising another rubber plug 58 secured in an aperture in the upper end closure 29.

An electric motor, of course, tends to heat up during operation and the parts thereof are thus subject to expansion because of temperature increase. Moreover, since a motor of the present type is adapted to be operated while submerged in a liquid, the heat in the outer portions of the motor, particularly in the shell 10, is rather rapidly carried off by the liquid, so that the interior portions of the motor, such as the liner 48, tend to reach a higher temperature than the shell 10. To compensate for expansion and contraction of the liner 48, I provide the interior bore of the stator 11 with a plurality of axially spaced circumferential or peripheral grooves 59. Although only one such groove 59 is shown in Fig. 1, it will be understood that any desired number may be provided at spaced intervals along the length of the stator. The liner 48 extends or bulges into the grooves 59, as best seen at 60 in Fig. 2, and thereby permits longitudinal expansion of the liner without danger of failure of the liner. Similarly, upon contraction the liner can again bulge into the grooves 59 without danger of blistering inwardly into the air gap between the stator 11 and the rotor 12.

The laminated core structure must also be controlled as to its expansion. Because of the laminated construction, the core structure does not act like a homogeneous material but rather has a spongy or springy action due probably to the fact that the respective laminations are not perfectly flat and may even have slight burrs which would prevent them from lying truly flat against each other. It is, therefore, desirable to confine the expansion of the core structure to that of the outer shell 10, and it will be noted that with the structure herein described this result is attained. The end closures 16 and 29 have the inner ends of their cylindrical portions 51 abutting the core structure adjacent the inner periphery thereof, and when the end closures are assembled they are pressed inwardly to apply the desired pressure to the core structure and then welded, as at 46, to the shell 10 in order to retain the assembly in permanently secured relation. The metal of which the laminations are made is determined by electrical considerations and may have a different coefficient of expansion from that of the shell but the springy nature of the core structure compensates for such difference and permits the expansion of the core structure to be held to that of the shell. The end closures 16 and 29 are also preferably made of stainless steel so that they will have the same coefficient of thermal expansion as the shell 10 whereby the core structure at its inner periphery will expand and contract substantially equally with the shell for the same temperature change.

Since the total endwise expansion of the inner surface of the core structure, to which the liner 48 is bonded, is thus correlated to that of the shell, the total expansion of the liner should be made to match that of such inner surface so that it will not be unduly stressed on expansion nor caused to bulge when contraction on cooling takes place. The peripheral grooves 59 discussed above, are provided to compensate for the higher temperature of the interior portions of the motor. However, inasmuch as both the shell 10 and the liner 48 are preferably made of stainless steel, it may be desirable to pre-stress the liner lengthwise thereof when it is bonded to the core structure and end closures in order to provide additional protection against bulging or blistering of the liner. Such pre-stressing of the liner may be accomplished by heating the liner to the desired degree during the bonding operation while the shell remains cool.

The slots 41 within which the windings are located are preferably filled with a plastic filler or sealing compound 47 having adhesive properties which retains the windings in place and also bonds to the liner and thus provides additional support at the bulged portions 50 which bridge the open inner ends of the slots 41 and close them. Such a plastic filler is preferably of a thermosetting resinous character, e. g. I have found that the product commercially available under the name "Selectron" is particularly suitable for this purpose. Although the plastic filler alone may be employed, I prefer to utilize a mixture of the plastic filler with a substantially inert granular material, such as sand, which is a non-conductor of electricity but is a good heat conductor. Not only does this diminish the quantity of plastic which is required, but also the sand being a good heat conductor serves very effectively to facilitate the flow of heat from the stator 11 to the shell 10 and into the surrounding liquid in which the motor is submerged. Inasmuch as a substantial temperature rise occurs during the operation of the motor, it will be seen that cooling of the stator 11 is an important consideration in a motor of this character. The sand or equivalent material functions as the heat conductor and the plastic material fills the voids between the sand particles thereby eliminating air which would have the effect of retarding the flow of heat through the sand.

An important feature of my invention resides in the method or technique which I employ for assembling the liner 48 in bonded relation with the stator 11. In order to obtain the construction previously described, I prefer to employ the following sequence of operations:

First, the inside of the stator bore, including the interior of the end closures 16 and 29, and the outside of the thin cylindrical liner 48 are coated by painting or spraying the same with a suitable metal-to-metal adhesive or bonding material, such as the product known commercially as "Pliobond" and manufactured by the Goodyear Company. After the coated articles have been permitted to stand for a short time in order to allow the escape of volatile solvents in the adhesive, the liner 48 is then inserted loosely in the bore of the stator 11. The diameter of the liner 48 is sufficiently less than the diameter of the stator bore, e. g. a clearance of .015 inch, to permit the liner to be fitted easily into the stator. With the liner thus in proper position within the stator, an expansible member in the form of an elongated rubber plug is inserted into the liner. A heat resistant rubber such as a silicone rubber is particularly useful. By application of axial pressure at its opposite ends, the rubber plug is squeezed or compressed whereby to effect radial expansion of the liner 48 into the peripheral grooves 59 and also into the longitudinally extending openings of the slots 41 whereby to form the peripheral ribs or ridges 60 and the longitudinal ribs 50. At the same time, the remaining portions of the liner 48 are pressed firmly into adhesive engagement with the interior of the stator bore and the end closures 16 and 29. The entire stator structure may then be baked at a suitable temperature to effect curing of the adhesive or cement if such is necessary.

With the liner 48 secured in place within the stator bore, I now carry out the filling of the interior of the stator with the filler material 47. To this end, it will be seen in Fig. 1 that the upper closure 29 and the lower closure 16 are each provided with a filler hole 61 which may be closed by means of a removable threaded plug 62. First, the plug 62 is removed from the upper filler hole 61 and sand is poured through the upper hole until the interior of the stator structure is filled. The mesh of the sand is not particularly important but I prefer to employ a good grade of white sea sand. Following the filling of the stator with sand, the stator is then immersed in a bath of liquid plastic such as the "Selectron" commercial plastic hereinbefore mentioned. The plastic bath is preferably contained in an open container which is in turn housed in a pressure chamber from which air may be exhausted or admitted under pressure, as desired. After the stator is immersed in the bath of liquid plastic, air is exhausted from the surrounding chamber whereby to insure complete removal of air from the sand-packed stator interior. Following this, air pressure is admitted to the chamber until a relatively high pressure, e. g. 100 lbs. per square inch, is obtained to force the liquid plastic under pressure into the voids in the sand. After the sand-packed stator has thus been filled with plastic under pressure, the stator may be removed from the plastic bath and the plastic allowed to harden or cure if necessary.

In the foregoing description a layer of metal-to-metal adhesive is utilized for bonding the liner to the laminated core structure whereby to provide the necessary support for the thin liner throughout substantially its entire length and area. It is also within the scope of my invention to bond or secure the liner in place within the bore of the core structure by welding the same at a plurality of closely spaced points, e. g. $1/16$ or $1/8$ of an inch apart, extending both circumferentially and longitudinally throughout substantially the entire area of contact between the liner and the laminations and also between the liner and the end closures. Such multiple spot welding, known as stitch welding, will likewise provide the necessary rigid support for the thin liner throughout substantially its entire length and contact area. When utilizing welding in this manner, the liner is first inserted within the bore of the core structure and then expanded into contact with the laminations by the application of radially expanding force in the manner previously described. With the thin liner thus expanded into close contact with the core structure, the stitch welding may then be carried out to effect permanent bonding of the liner throughout its length and area.

By means of my invention, a seal is provided which effectively excludes the liquid from the stator structure but at the same time electrical losses due to the presence of the seal are held to a minimum. Even though the liner is quite thin, it is firmly bonded to the stator core and I have found by experimental tests that a thin liner bonded according to my invention can resist internal pressures in the core structure of 100 lbs. per square inch or more without blistering or other failure. It will also be recognized that the foregoing form of seal may be readily applied to the stator of the motor in a simple manner and at a relatively low manufacturing cost. Moreover, it will be seen that the method of securing the liner to the stator and the method of filling the stator structure, which comprise important features of my invention as just described, provide simple and inexpensive techniques for effectively bonding the stator liner and for filling the stator with a heat conducting material which also serves to retain the stator windings in place.

I claim:

1. A submersible motor having an annular stator adapted to be exposed to liquid both externally and internally, said stator comprising an external shell, laminated core structure within said shell, windings disposed in said core structure, a thin metal liner adhesively bonded throughout its length to the bore of said core structure, and means for sealing the ends of the stator, said core structure being provided with at least one circumferentially extending groove at an intermediate portion of the bore of the core structure and said liner bulging outwardly into said groove whereby to permit lengthwise expansion and contraction of the liner without internal blistering thereof.

2. A stator for a submersible electric motor comprising annular laminated core structure having an axial bore, windings disposed in said core structure, a thin metal liner secured in the bore of said core structure for sealing the interior thereof, and means for sealing the exterior of the core structure and the ends of the stator, said core structure being provided with circumferentially extending groove means in the bore thereof with said liner bulging outwardly into said groove means whereby to facilitate lengthwise expansion and contraction of the liner.

3. The structure of claim 2 further characterized in that a layer of adhesive material is interposed between said liner and the bore of said core structure for adhesively bonding the liner to the core structure substantially throughout the entire length of the liner.

References Cited in the file of this patent

UNITED STATES PATENTS

| Number | Name | Date |
|---|---|---|
| 282,914 | Martin | Aug. 7, 1883 |
| 396,334 | Gilson | Jan. 15, 1889 |
| 1,019,407 | Bakeland | Mar. 5, 1912 |
| 1,930,797 | Gold | Oct. 17, 1933 |
| 2,128,544 | Surjaninoff | Aug. 30, 1938 |
| 2,163,213 | Springer | June 20, 1939 |
| 2,246,777 | Bordeaux | June 24, 1941 |
| 2,310,422 | Gold | Feb. 9, 1943 |
| 2,400,192 | Coons | May 14, 1946 |
| 2,422,592 | Sigmund | June 17, 1947 |
| 2,428,236 | Maxwell | Sept. 30, 1947 |
| 2,460,418 | Hart | Feb. 1, 1949 |
| 2,485,408 | Pezzillo | Oct. 18, 1949 |
| 2,517,233 | Peters | Aug. 1, 1950 |
| 2,524,885 | Clokey | Oct. 10, 1950 |
| 2,573,126 | Andrus | Oct. 30, 1951 |

FOREIGN PATENTS

| Number | Country | Date |
|---|---|---|
| 121,490 | Great Britain | Dec. 18, 1918 |
| 448,274 | Great Britain | June 5, 1936 |
| 489,506 | Great Britain | July 28, 1938 |
| 520,808 | Germany | Mar. 14, 1931 |